United States Patent [19]

Yamamoto et al.

[11] Patent Number: 5,391,618
[45] Date of Patent: Feb. 21, 1995

[54] PROPYLENE RESIN COMPOSITIONS

[75] Inventors: Koji Yamamoto; Hajime Ikeno; Keiko Shichijo, all of Yokkaichi, Japan

[73] Assignee: Mitsubishi Petrochemical Company Limited, Tokyo, Japan

[21] Appl. No.: 135,553

[22] Filed: Oct. 14, 1993

[30] Foreign Application Priority Data

Oct. 15, 1992 [JP] Japan ................... 4-277407

[51] Int. Cl.$^6$ ............... C08L 23/20; C08L 23/08; C08L 23/10; C08L 53/00
[52] U.S. Cl. ................................ 525/88; 525/240
[58] Field of Search .................... 525/240, 88

[56] References Cited

U.S. PATENT DOCUMENTS

| | | | |
|---|---|---|---|
| 4,742,106 | 5/1988 | Kamiya et al. | 524/528 |
| 4,748,206 | 5/1988 | Nagiwa et al. | 525/88 |
| 5,206,075 | 4/1993 | Hodgson | 525/240 |
| 5,229,478 | 7/1993 | Floyd et al. | 526/129 |
| 5,268,220 | 12/1993 | Tajima et al. | 525/240 |

FOREIGN PATENT DOCUMENTS

| | | |
|---|---|---|
| 0235956 | 9/1987 | European Pat. Off. |
| 0490353 | 6/1992 | European Pat. Off. |
| 58-157839 | 9/1983 | Japan. |
| 61-243842 | 10/1986 | Japan. |
| WO92/14784 | 9/1992 | WIPO. |

OTHER PUBLICATIONS

Jefferies—The Marketing Challenge Created by Single Site Catalysts in Polyolefins—"Specialty P.O. Conference"—Sep. 1991, pp. 43–55.

Speed et al.—Structure/Prop. Relationships in EXXPOL TM Polymers Soc. of Plas. Eng. Polyolefins Conference—Feb. 1991, pp. 1–5.

*Primary Examiner*—Carman J. Seccuro, Jr.
*Attorney, Agent, or Firm*—Oblon, Spivak, McClelland, Maier & Neustadt

[57] ABSTRACT

A propylene resin composition comprising:
- 50 to 97% by weight of component (A) which is a propylene polymer having an MFR of 5 to 200 g/10 min, and
- 50 to 3% by weight of component (B) which is an ethylene-α-olefin copolymer of an α-olefin content of 10 to 60% by weight and of an α-olefin having 4 to 18 carbon atoms, said ethylene-α-olefin copolymer having the following properties (a) to (c):
  - (a): a density of 0.913 g/cm$^3$ or less,
  - (b): an MFR of 0.01 to 20 g/10 min, and
  - (c): a flexural rigidity according to ASTM D747 of 2,000 kg/cm$^2$ or less.

The composition has improved impact resistance at both room temperature and low temperatures, a good property balance between rigidity and impact resistance, and high moldability.

20 Claims, No Drawings

PROPYLENE RESIN COMPOSITIONS

BACKGROUND OF THE INVENTION

1. Field of the Invention

The present invention relates to propylene resin compositions which have improved impact resistance at both room temperature and low temperatures, which have excellent property balance between rigidity and impact resistance, and which are useful for exterior and interior automotive trims, exterior trim parts of electrical apparatus, and the like.

2. Related Art

A propylene resin has high rigidity and high moldability, and is inexpensive. Its use is therefore expanding recently at an increasing tempo in the fields of exterior and interior automotive trims, for instance, bumpers, manuals, front grilles and interior panels, exterior trim parts of electrical apparatus, and the like.

However, even such a polypropylene resin has a shortcoming in that its impact resistance is still insufficient depending upon its use. In order to overcome this shortcoming, a polypropylene resin has conventionally been blended with a rubbery elastic material such as ethylene-propylene copolymer rubber, ethylene-butene copolymer rubber or ethylene-propylene-diene copolymer rubber.

It is, however, difficult to obtain a composition which has excellent property balance between impact resistance and rigidity by blending a propylene resin with the above rubbery elastic material with the intention of solving the aforementioned problem while retaining high rigidity which is an advantageous property inherent to a polypropylene resin.

An object of the present invention is to provide a propylene resin composition which has excellent property balance between impact resistance and rigidity by improving its impact resistance while retaining its high rigidity which is an advantageous property of a polypropylene resin.

SUMMARY OF THE INVENTION

In view of the above problem, we have made intensive studies and, as a result, found that the above object can be attained by a propylene resin composition obtained by blending a propylene polymer with an ethylene-α-olefin copolymer of an α-olefin content of 10 to 60% by weight having specific following properties (a) to (c):

(a): a density of no higher than 0.913 g/cm$^3$
(b): an MFR of 0.01 to 20 g/10 min., and
(c): a flexural rigidity according to ASTM D747 of no higher than 2000 kg/cm$^2$.

The present invention has been accomplished on the basis of the above finding.

Specifically, the present invention provides propylene resin composition which comprises:

50 to 97% by weight of a component (A) which is a propylene polymer having an MFR of 5 to 200 g/10 min, and 50 to 3% by weight of a component (B) which is an ethylene-α-olefin copolymer of an α-olefin content of 10 to 60% by weight and of an α-olefin having 4 to 18 carbon atoms, said ethylene-α-olefin copolymer having the following properties (a) to (c):

(a): a density of no higher than 0.913 g/cm$^3$
(b): an MFR of 0.01 to 20 g/10 min, and
(c): a flexural rigidity according to ASTM D747 of no higher than 2,000 kg/cm$^2$.

DETAILED DESCRIPTION OF THE INVENTION

[I] Propylene Resin Composition (1) Components (a) The Component (A) is a propylene polymer having a specific MFR value.

Chemical entity

The propylene polymer, the component (A) of the propylene resin composition according to the present invention, is preferably a homopolymer of propylene, or a copolymer, for example, a random or block copolymer, of propylene and an α-olefin, preferably an α-olefin having 2 to 12 (in which 3 is excluded as a matter of course) carbon atoms. There is no particular limitation on the method for preparing this propylene polymer. However, in general, the polymer is a propylene homopolymer obtained by homopolymerizing propylene in a single stage or multiple stages, or a propylene-α-olefin copolymer obtained by copolymerizing propylene and an α-olefin having 4 to 12 carbon atoms, preferably ethylene, in a single stage or multiple stages, by such a polymerization method as slurry polymerization, gas phase polymerization, bulk polymerization, solution polymerization or a combination thereof, using a so-called Ziegler-Natta catalyst, which is usually one comprising a solid transition metal component comprising titanium, particularly a catalyst consisting of, as a transition metal/solid component, a solid composition or titanium trichloride which contains as essential components titanium, magnesium and a halogen and as an optical component an electron-donor compound, and as an organometallic component an organoaluminum compound.

When the above propylene polymer is a random copolymer, the percentage of the copolymerized α-olefin in the copolymer is, in general, up to 10% by weight, preferably 0.5 to 7% by weight. When the above propylene polymer is a block copolymer, the percentage of the copolymerized α-olefin in the copolymer is, in general, 1 to 40% by weight, preferably 1 to 25% by weight, more preferably 2 to 20% by weight, and most preferably 3 to 15% by weight.

This copolymer may be either a random copolymer or a block copolymer. However, it is preferable to use a propylene-ethylene block copolymer, particularly a block copolymer comprising a propylene homopolymer block and a propylene-ethylene copolymer block which may be prepared by homopolymerizing propylene and then continuing the polymerization for a mixture of propylene with ethylene, which block copolymer may alternatively be called "a chemical blend of a propylene homopolymer and a propylene random copolymer". The reason for this is that such a block copolymer can balance the properties of a final composition to a higher degree, thereby ensuring more ready attainment of the object of the present invention.

Further, the propylene polymer can be a combination of two or more such polymers.

MFR

The propylene polymer as Component (A) is characterized by its MFR.

The MFR of the propylene polymer is, in general, 5 to 200 g/10 min, preferably 7 to 150 g/10 min, and more preferably 10 to 100 g/10 min.

When the MFR value of the propylene polymer is too small, it becomes difficult to conduct forming or molding, especially injection molding, of the blend, m=namely the propylene resin composition according to the present invention. On the other hand, when the MFR value is too high, a final composition tends to have reduced impact strength in the blend.

Flexural modulus

It is preferable that the propylene polymer as Component (A) has a flexural modulus according to JIS K7203 of the propylene polymer of no lower than 5,000 kg/cm$^2$, preferably 6,000 to 20,000 kg/cm$^2$, and more preferably 8,000 to 18,000 kg/cm$^2$.

Characteristics upon the pulse NMR analysis

The propylene polymer as Component (A) is characterized also by its crystalline structure such that the weight ratio of the crystalline phase (I)/the intermediate phase is 1.5 to 4, preferably 2 to 3.5 and the content of the amorphous phase is 3–30% by weight, preferably 5 to 20% by weight, where these phases are determined by the method of K. Fujimoto, T. Nishi and R. Kado: Polym. J. Vol. 3, 448–462 (1972).

When the ratio (I)/(II) is smaller than the level of the above range, the propylene polymer would have undesirably low thermal resistance, and when the ratio is larger than the level of the above range, the propylene polymer would have undesirably low tensile elongation property. When the value (III) is higher than the level of the above range, the propylene polymer would produce molded/formed articles which are undesirably susceptible to marring on the surface.

(b) Component (B)

The Component (B) is an ethylene-α-olefin copolymer specified in its monomeric species, its catalyst used for its preparation and its physical characteristics.

Olefin

Examples of the α-olefin having 4 to 18 carbon atoms, which is copolymerized with ethylene as a comonomer of the ethylene-α-olefin copolymer, the component (B), for use in the propylene resin composition of the present invention include 1-butene, 1-pentene, 1-hexene, 1-octene, 1-heptene, 4-methyl-pentene-1, 4-methyl-hexene-1, 4,4-dimethylpentene-1 and 1-octadecen. of these, an α-olefin having 6 to 12 carbon atoms, particularly 6 to 10 carbon atoms, is preferred. One, or two or more of the above α-olefins can be copolymerized with ethylene.

The preferable ethylene-α-olefin copolymer is an ethylene-1-hexene random copolymer.

The α-olefin content of the ethylene-α-olefin copolymer may, in general, be 10 to 60% by weight, preferably 20 to 55% by weight, and more preferably 20 to 50% by weight. When the α-olefin content is too low, the improvement effects may be marred. On the other hand, when the content is too high, the amount of a non-crystalline component is increased, and, as a result, the blend, namely the propylene resin composition according to the present invention, will produce a molded product which is "sticky".

Physical characteristics

It is essential in the present invention that Component (B) have properties (a) to (c) given below.

(a) Density

The ethylene-α-olefin copolymer is required to have a specified density.

The density of the ethylene-α-olefin copolymer thus obtained by the high-pressure ionic polymerization method meets the requirement that it be no higher than 0.913 g/cm$^3$, preferably 0.853 to 0.900 g/cm$^3$, more preferably 0.853 to 0.890 g/cm$^3$, and still more preferably 0.853 to 0.880 g/cm$^3$. It may be difficult to obtain a product having a density of lower than 0.850 g/cm$^3$ by the current industrial art. However, it is presumed that even when the copolymer has a density lower than this value, it can bring about the effects of the invention.

In the case where the above density is too high, an amply high impact strength may not be obtainable.

(b) MFR

The MFR required of the ethylene-α-olefin copolymer for use in the present invention is, in general, 0.01 to 20 g/10 min, preferably 0.1 to 10 g/10 min, more preferably 0.3 to 5 g/10 min, and most preferably 0.5 to 2 g/10 min.

In the case where the above MFR is too low, the copolymer may not be thoroughly dispersed in the propylene polymer of Component (A). On the other hand, when the MFR is too high, an amply high impact strength may not be obtained in the blend, namely the propylene resin composition according to the present invention.

(c) Flexural rigidity

The flexural rigidity according to ASTM D747 required of the ethylene-α-olefin copolymer, the Component (B), for use in the present invention is no higher than 2,000 kg/cm$^2$, preferably no higher than 1,000 kg/cm$^2$, more preferably no higher than 500 kg/cm$^2$, and most preferably no higher than 300 kg/cm$^2$. Excessively high flexural rigidity of the Component (B) will reduce the impact strength of the blend thereof with Component (A).

Polymerization/Catalyst

The ethylene-α-olefin copolymer, the Component (B), for use in the propylene resin composition according to the present invention is obtained by copolymerizing ethylene and an α-olefin having 4 to 18 carbon atoms by the use of a so-called Kaminsky catalyst or a metallocene catalyst, a catalyst which comprises a combination of (i) a metallocene compound which has such a structure that 1 or 2 ligands having a cyclopentadienyl structure is coordinated with a transition metal of a Group IVb to VIb of the Periodic Table, preferably titanium, zirconium or hafnium and (ii) an alumoxane, which has been made known by Japanese Laid-Open Patent Publications Nos. 19309/1983, 95292/1984, 35005/1985, 35006/1985, 5007/1985, 35008/1985, 35009/1985, 163088/1991, European Laid-Open Patent Publication No. 420436, U.S. Pat. No. 5,055,438, and International Publication WO 91/04257, Japanese Laid-Open Patent Publication No. 163088/1991 and International Publication WO 91/04257, particularly the latter, being specifically referred to.

A gas phase, slurry, solution or high-pressure ionic polymerization method is an example of a method for preparing the ethylene-α-olefin copolymer, using a so-called Kaminsky catalyst. Of these, a high-pressure ionic polymerization method and a solution method, where polymerization is conducted at a temperature higher than the melting point of the resulting polymer but up to 280° C., are preferred. It is particularly preferable to prepare the copolymer by a high-pressure ionic polymerization method because the copolymer prepared by this method can impart the remarkable effects of the invention to a final composition.

The high-pressure ionic polymerization method, which has been made known by Japanese Laid-Open Patent Publications Nos. 18607/1981 and 225106/1983, is a continuous method for preparing an ethylene polymer conducted under the reaction conditions of a pressure of no lower than 200 kg/cm$^2$, preferably 300 to 2,000 kg/cm$^2$, and a temperature of no lower than 125° C., preferably 130° to 250° C., more preferably 150° to 200° C.

It is essential in the present invention that the ethylene-$\alpha$-olefin copolymers prepared by the methods given above have the properties (a) to (c) given above.

Optional Component/Component (C)

An auxiliary additive which may generally be used in the production of a resin composition, for example, an antioxidant, a heat stabilizer, a photo-stabilizer, an ultraviolet absorbing agent, a neutralizer, a coloring agent, a lubricant or an antistatic agent may optionally be added to the propylene resin composition of the present invention.

Further, a filler such as calcium carbonate, kaolin, talc, mica, hollow glass beads, titanium oxide, silica, carbon black, asbestos, glass fiber or potassium titanate fiber; or a compatible resin or rubber such as an olefin copolymer other than the above Component (B) for use in the present invention, a polystyrene resin, an acrylonitrile-butadiene-styrene copolymer resin, an ethylene-vinyl acetate copolymer resin, ethylene-propylene rubber, styrene-butadiene rubber or polybutadiene can also be incorporated into the composition of the present invention.

(2) Incorporation Ratio

The above Components (A) and (B) are incorporated into the propylene resin composition of the present invention preferably in a weight ratio of Component (A):Component (B) of (97:3) to (50:50), more preferably (93:7) to (55:45), still more preferably (90:10) to (60:40), and most preferably (80:20) to (65:35).

When the proportion of the above Component (B) is at too high a level, the rigidity of the composition may be impaired, and when it is at too low a level, the advantages inherent in the present invention may be marred.

[II] Preparation of the Resin Composition (1) Melting and Kneading

The propylene resin composition of the present invention can be prepared by the same method as is used for preparing an ordinary resin composition except that the above-described components are incorporated preferably in the above-described ratio.

For instance, Components (A) and (B) are ordinarily melted and kneaded by a Brabender Plastograph, a Banbury mixer, a kneader blender or the like, and the resulting mixture is then pelleted by an ordinary method.

(2) Molding

The above-obtained pellets can be molded or formed into various molded/formed products. It is particularly preferable to subject the composition of the present invention to injection molding because the product thus obtained can exhibit the effects advantages inherent in the present invention most remarkably.

EXAMPLES

In order to describe the present invention more specifically, Experimental Examples of the invention are given below which are not limitative.

(1) Evaluation Methods

The methods of evaluation and measurement of the physical properties adopted in the following Examples and Comparative Examples are as follows:
(a) MFR: measured in accordance with JIS K7210
(b) Density: measured in accordance with JIS K7112
(c) $\alpha$-Olefin content: measured in accordance with the method using $C^{13}$-NMR described in "Macromolecules" 15, 353–360 (1982) for the ethylene/butene-1 copolymer, "Macromolecules", 15, 1402–1406 (1982) for the ethylene/hexene-1 copolymer, and "Macromolecules", 17, 1950–1955 (1984) for the propylene/ethylene copolymer, under the following conditions:
Apparatus: JEOL-GSX270 (manufactured by Nippon Denshi, Japan)
Solvent: o-dichlorobenzene (70)/ds-benzene (30) (v/v)%
Concentration: 10 (wt/v) %
Temperature: 130° C.
Spectral band width: 11,000 Hz
Data point number: 16 k
Pulse width: 16 $\mu$s (60°)
Pulse interval: 4 s
Integral number: 3,000 times
(d) Flexural rigidity: measured in accordance with ASTM D747
(e) Flexural modulus (three-point flexural modulus): measured in accordance with JIS K7203
(f) Izod impact strength: measured in accordance with JIS K7110 (temperatures for measurement: 23° C. and −40° C.)
(g) Thermal resistance: measured by the HDT test in accordance with JIS K7207
(h) Tensile elongation characteristic: measured by the tensile test in accordance with JIS K7113
(i) Surface hardness: indicated by the Rockwell Hardness in accordance with JIS K7202
(j) Pulse NMR: measured by an apparatus: JEOL-GSX 270 (Nippon Denshi, Japan) on a sample at 30° C. so that the solid echo is determined at 90°, pulse width 1.8 $\mu$s. The data obtained showing magnetization decrease curve is logarithmically plotted and analyzed by the method of K. Fujita, T. Nishi and R. Kado: Polym. J. Vol. 3, 438–462 (1972) for separation of components whereby % contents of the components are determined.

(2) Experimental Examples

Example 1

[Synthesis of Propylene Polymer/Component (A)]
Into an autoclave of a capacity of 200 liter equipped with a stirring means thoroughly purged with propylene were introduced 60 liter of n-heptane dehydrated and deoxygenated, followed at 60° C. under propylene atmosphere by 38 g of diethylaluminum chloride and 12.7 g of titanium trichloride (Marubeni-Solvay).

The autoclave was heated to 65° C. and propylene was fed at a rate of 9 kg/hour, together with hydrogen of a hydrogen concentration maintained at 10%, thereby to start a first step polymerization.

203 minutes after the start of polymerization, propylene feed was stopped and the polymerization was continued at 65° C. for further 90 minutes. The propylene in the gas phase was then purged until the pressure became 0.2 kg/cm$^2$G.

The autoclave was then cooled to 60° C., and a second step polymerization was started with ethylene as an α-olefin fed at a rate of 2.70 g/hour and propylene was fed at a rate of 4.06 kg/hour for the period of 30 minutes.

The slurry thus produced was subjected to filtration and drying of the resultant cake to yield 35.41 kg of a powder polymer, which was found to have an MFR of 30 g/10 min. and α-olefin content of 4% by weight and a flexural modulus of 15,000 kg/cm$^2$.

[Synthesis of Ethylene-α-Olefin Copolymer/Component (B)]

A catalyst component was synthesized by the method described in the Specification of International Publication WO 91/04257. To 2.1 mmol of the complex Me$_2$Si(C$_5$Me$_4$)—(NC$_{12}$H$_{23}$)TiCl$_2$ thus obtained, methyl aluminoxane manufactured by Toyo Stauffer was added in an amount of 1,000 mol times the amount of the complex, and the mixture was diluted with 10 liters of toluene. By using the resulting solution of the catalyst, polymerization was conducted in the following manner.

A mixture of ethylene and 1-hexene (78% by weight) was fed in a continuous reactor comprising an autoclave having an internal volume of 1.5 liters.

A polymerization reaction was carried out at a temperature of 180° C. while the pressure of the reactor was maintained at 1,000 kg/cm$^2$.

After the reaction was completed, an ethylene copolymer, Component (B), having an MFR of 1.5 g/10 min, a density of 0.861 g/cm$^3$, and a 1-hexene content of 48% by weight was obtained.

[Preparation of Composition]

70% by weight of a propylene polymer, Component (A), which was a propylene-ethylene block copolymer having an α-olefin content of 4% by weight, an MFR of 30 g/10 min and a flexural modulus according to JIS K7203 of 15,000 kg/cm$^2$, and 30% by weight of the above ethylene-α-olefin copolymer, Component (B), having an MFR of 1.5 g/10 min, a density of 0.861 g/cm$^3$, an α-olefin content of 48% by weight and a flexural rigidity of 0 kg/cm$^2$ were dry-blended homogeneously. The mixture was melted and kneaded by a twin-screw extruder at a cylinder temperature of 210° C., and then subjected to granulation.

The pellets thus obtained were molded by an injection molding machine to prepare test pieces, and the Izod impact strength and the three-point flexural modulus thereof were measured. The results were as shown in Table 1.

Examples 2 to 17

In the same manner as in Example 1, a composition was prepared by using 70% by weight of the propylene polymer, the Component (A), used in Example 1, and 30% by weight of an ethylene-α-olefin copolymer, Component (B), having the physical properties as shown in Table 1 and prepared in the same manner as in Example 1 except that the constitution of the mixture of the ethylene and the α-olefin was changed, and subjected to molding and evaluation. The results were as shown in Tables 1 to 3.

Example 18

The procedure of Example 1 was repeated except that the propylene polymer, the Component (A), used in Example 1 was replaced by a propylene polymer having an MFR of 100 g/10 min and a flexural modulus of 15,000 kg/cm$^2$, containing no α-olefin, thereby obtaining a composition which was molded and then evaluated in the same manner as in Example 1. The results were as shown in Table 3.

Example 19

The procedure of Example 1 was repeated except that 90% by weight of the propylene polymer, the Component (A), and 10% by weight of the ethylene-α-olefin copolymer, the Component (B), were used, thereby obtaining a composition which was molded and then evaluated in the same manner as in Example 1. The results were as shown in Table 3.

Example 20

The procedure of Example 1 was repeated except that a propylene polymer having a flexural modulus according to JIS K7203 of 10,000 kg/cm$^2$ was used, thereby obtaining a composition which was molded and then evaluated in the same manner as in Example 1. The results were as shown in Table 3.

Comparative Examples 1–3

In the same manner as in Example 1, a composition was prepared by using 70% by weight of the propylene polymer used in Example 1, and 30% by weight of "Toughmer A4085" (Trademark, manufactured by Mitsui Petrochemical Industries, Ltd.). (Comparative Example 1), "EP02P" (Trademark, manufactured by Japan Synthetic Rubber, Co., Ltd.) (Comparative Example 2) or "EP07P" (Trademark) (Comparative Example 3) produced by using a vanadium catalyst, instead of the ethylene-α-olefin copolymer prepared by using a Kaminsky catalyst, and then subjected to molding and evaluation. The results were as shown in Table 4.

Comparative Example 4

In the same manner as in Example 1, a composition was prepared by using 70% by weight of the propylene polymer, the Component (A), used in Example 1, and 30% by weight of an ethylene-α-olefin copolymer prepared by a high-pressure ionic polymerization method using a titanium catalyst, having an MFR of 1.2 g/10 min, a density of 0.890 g/cm$^3$ and an α-olefin content of 22% by weight, instead of the ethylene-α-olefin copolymer, the component (B), prepared by using a Kaminsky catalyst, and then subjected to molding and evaluation. The results were as shown in Table 4.

Comparative Example 5

The procedure of Example 1 was repeated except that the propylene polymer, the Component (A), used in Example 1 was replaced by a propylene polymer having an MFR of 300 g/10 min and a flexural modulus of 15,000 kg/cm$^2$, containing no α-olefin, thereby obtaining a composition which was molded and then evaluated in the same manner as in Example 1. The results were as shown in Table 4.

Comparative Example 6

The procedure of Example 1 was repeated except that 40% by weight of the propylene polymer, the Component (A), used in Example 1, and 60% by weight of the ethylene-α-olefin copolymer used in Example 1 were used, thereby obtaining a composition which was molded and then evaluated in the same manner as in Example 1. The results were as shown in Table 4.

Comparative Example 7

The procedure of Example 1 was repeated except that 70% by weight of the propylene polymer, the Component (A), used in Example 1, and, instead of the ethylene-α-olefin copolymer, the Component (B), used in Example 1, 30% by weight of an ethylene-α-olefin copolymer with the MFR, the density, and the type and amount of comonomer as shown in Table 4, the MFR being higher, were used, thereby obtaining a composition which was molded and then evaluated in the same manner as in Example 1. The results were as shown in Table 4.

Comparative Example 8

The procedure of Example 1 was repeated except that 70% by weight of the propylene polymer, the Component (A), used in Example 1, and, instead of the Component (B) used in Example 1, 30% by weight of an ethylene-α-olefin copolymer with the MFR, the density, and the type and amount of comonomer as shown in Table 5, the density and the amount of the comonomer outside of the range required, were used, thereby obtaining a composition which was molded and then evaluated in the same manner as in Example 1. The results were as shown in Table 5.

Comparative Example 9

The procedure of Example 1 was repeated except that 70% by weight of the propylene polymer, the Component (A), used in Example 1, and, instead of the Component (B) used in Example 1, 30% by weight of an ethylene-α-olefin copolymer with the MFR, the density, and the type and amount of comonomer as shown in Table 5, the amount of the comonomer being excessively high, were used, thereby obtaining a composition which was molded and then evaluated in the same manner as in Example 1. The results were as shown in Table 5.

Comparative Example 10

The procedure of Example 1 was repeated except that 70% by weight of the propylene polymer, the Component (A), used in Example 1, and, as a Component (B), 30% by weight of an ethylene-α-olefin copolymer with the MFR, the density, and the type and amount of comonomer as shown in Table 5, the monohomer being propylene, were used, thereby obtaining a composition which was molded and then evaluated in the same manner as in Example 1. The results were as shown in Table 5.

Comparative Example 11

In the same manner as in Example 1, a composition was prepared by using only the propylene polymer, the Component (A), used in Example 1, and subjected to molding and evaluation. The results were as shown in Table 5.

Comparative Example 12

The procedure of Example 1 was repeated except that, as a Component (A), 70% by weight of a propylene polymer having an MFR of 3 g/10 min and a flexural modulus of 15,000 kg/cm$^2$, and 30% by weight of the ethylene-α-olefin copolymer used in Example 1 were used, thereby obtaining a composition which was molded and then evaluated in the same manner as in Example 1. The results were as shown in Table 5.

Examples 21–25 and Comparative Examples 13–17

The procedures as set forth in Example 1 om production of Component (A), in preparation of samples and in determination of the properties of samples were followed except for the changes in the nature of Component (A) and Component (B).

The results obtained are set forth in Tables 6 and 7.

TABLE 1

|  |  | Example 1 | Example 2 | Example 3 | Example 4 | Example 5 | Example 6 | Example 7 |
|---|---|---|---|---|---|---|---|---|
| Propylene polymer | MFR (g/10 min) | 30 | 30 | 30 | 30 | 30 | 30 | 30 |
|  | Incorporation amount (wt %) | 70 | 70 | 70 | 70 | 70 | 70 | 70 |
| Ethylene-α-olefin Copolymer | MFR (g/10 min) | 1.5 | 3.9 | 0.5 | 1.5 | 1.9 | 3.7 | 4.2 |
|  | Density (g/cm$^3$) | 0.861 | 0.860 | 0.870 | 0.880 | 0.875 | 0.873 | 0.874 |
|  | α-Olefin | hexane | hexene | hexene | hexene | hexene | hexene | hexene |
|  | α-Olefin content (wt %) | 48 | 54 | 35 | 30 | 32 | 34 | 34 |
|  | Flexural rigidity (kg/cm$^2$) | 0 | 0 | 100 | 220 | 140 | 120 | 120 |
|  | Catalyst used | metallocene catalyst | metallocene catalyst | metallocene catalyst | metallocene catalyst | metallocene catalyst | metallocene catalyst | metallocene catalyst |
|  | Incorporation amount (wt %) | 30 | 30 | 30 | 30 | 30 | 30 | 30 |
| Izod impact Strength (kg · cm/cm$^2$) | (23° C.) | not broken | not broken | not broken | not broken | not broken | not broken | not broken |
|  | (−40° C.) | 13.6 | 12.0 | 9.6 | 8.8 | 8.3 | 7.9 | 7.1 |
| Flexural modulus | (kg/cm$^2$) | 7,740 | 8,530 | 8,310 | 9,300 | 9,080 | 10,040 | 10,370 |

TABLE 2

|  |  | Example 1 | Example 2 | Example 3 | Example 4 | Example 5 | Example 6 | Example 7 |
|---|---|---|---|---|---|---|---|---|
| Propylene polymer | MFR (g/10 min) | 30 | 30 | 30 | 30 | 30 | 30 | 30 |
|  | Incorporation amount (wt %) | 70 | 70 | 70 | 70 | 70 | 70 | 70 |
| Ethylene-α-olefin Copolymer | MFR (g/10 min) | 2.0 | 0.5 | 2.8 | 1.5 | 0.5 | 1.9 | 3.7 |
|  | Density (g/cm$^3$) | 0.890 | 0.859 | 0.866 | 0.860 | 0.870 | 0.866 | 0.878 |
|  | α-Olefin | hexane | butene | butene | butene | butene | butene | butene |
|  | α-Olefin content (wt %) | 25 | 38 | 55 | 37 | 32 | 35 | 28 |
|  | Flexural rigidity (kg/cm$^2$) | 450 | 0 | 0 | 0 | 100 | 0 | 190 |
|  | Catalyst used | metallocene catalyst | metallocene catalyst | metallocene catalyst | metallocene catalyst | metallocene catalyst | metallocene catalyst | metallocene catalyst |
|  | Incorporation amount (wt %) | 30 | 30 | 30 | 30 | 30 | 30 | 30 |
| Izod impact Strength (kg · cm/cm$^2$) | (23° C.) | not broken | not broken | not broken | not broken | not broken | not broken | not broken |
|  | (−40° C.) | 5.6 | 12.0 | 10.1 | 9.5 | 9.1 | 8.0 | 6.1 |
| Flexural modulus | (kg/cm$^2$) | 11,250 | 6,900 | 6,940 | 7,220 | 7,390 | 7,620 | 8,650 |

TABLE 3

|  |  | Example 15 | Example 16 | Example 17 | Example 18 | Example 19 | Example 20 |
|---|---|---|---|---|---|---|---|
| Propylene Polymer | MFR (g/10 min) | 30 | 30 | 30 | 100 | 30 | 30 |
|  | Incorporation amount (wt %) | 70 | 70 | 70 | 70 | 90 | 70 |
| Ethylene-α-olefin Copolymer | MFR (g/10 min) | 1.7 | 10.5 | 18.0 | 1.5 | 1.5 | 1.5 |
|  | Density (g/cm$^3$) | 0.906 | 0.860 | 0.861 | 0.861 | 0.861 | 0.861 |
|  | α-Olefin | hexene | hexene | hexene | hexene | hexene | hexene |
|  | α-Olefin content (wt %) | 16 | 48 | 48 | 48 | 48 | 48 |
|  | Flexural rigidity (kg/cm$^2$) | 1,160 | 0 | 0 | 0 | 0 | 0 |
|  | Catalyst used | mettalocene catalyst | mettalocene catalyst | mettalocene catalyst | mettalocene catalyst | mettalocene catalyst | mettalocene catalyst |
|  | Incorporation amount (wt %) | 30 | 30 | 30 | 30 | 10 | 30 |
| Izod impact Strength (kg · cm/cm$^2$) | (23° C.) | not broken | not broken | not broken | not broken | not broken | not broken |
|  | (−40° C.) | 4.1 | 9.2 | 5.9 | 8.2 | 5.1 | 14.3 |
| Flexural modulus | (kg/cm$^2$) | 10,400 | 9,680 | 10,410 | 7,200 | 13,980 | 7,000 |

TABLE 4

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Propylene polymer | MFR (g/10 min) | 30 | 30 | 30 | 30 | 300 | 30 | 30 |
|  | Incorporation amount (wt %) | 70 | 70 | 70 | 70 | 70 | 40 | 70 |
| Ethylene-α-olefin Copolymer | MFR (g/10 min) | 3.7 | 1.9 | 0.5 | 1.2 | 1.5 | 1.5 | 100 |
|  | Density (g/cm$^3$) | 0.888 | 0.862 | 0.859 | a.890 | 0.861 | 0.861 | 0.860 |
|  | α-Olefin | butene | propylene | propylene | butene | hexene | hexene | butene |
|  | α-Olefin content (wt %) | 19 | 31 | 33 | 22 | 48 | 48 | 50 |
|  | Flexural rigidity (kg/cm$^2$) | 350 | 0 | a | 450 | 0 | 0 | 0 |
|  | Catalyst used | vanadium catalyst | vanadium catalyst | vanadium catalyst | titanium catalyst | metallocene catalyst | metallocene catalyst | metallocene catalyst |
|  | Incorporation amount (wt %) | 30 | 30 | 30 | 30 | 30 | 60 | 30 |
| Izod impact Strength (kg · cm/cm$^2$) | (23° C.) | 57.5 | 45.0 | 59.0 | 19.4 | 1.1 | not broken | 3.6 |
|  | (−40° C.) | 4.9 | 6.3 | 7.4 | 5.2 | 2.0 | not broken | 1.2 |
| Flexural modulus | (kg/cm$^2$) | 10,360 | 9,080 | 8,040 | 9,320 | 4,970 | 1,200 | 9,030 |

TABLE 5

|  |  | Comparative Example 8 | Comparative Example 9 | Comparative Example 10 | Comparative Example 11 | Comparative Example 12 |
|---|---|---|---|---|---|---|
| Propylene polymer | MFR (g/10 min) | 30 | 30 | 30 | 30 | 3 |
|  | Incorporation amount (wt %) | 90 | 70 | 70 | 100 | 70 |
| Ethylene-α-olefin Copolymer | MFR (g/10 min) | 1.5 | 2.0 | 0.6 | — | 1.5 |
|  | Density (g/cm$^3$) | 0.920 | 0.862 | 0.859 | — | 0.861 |
|  | α-Olefin | hexane | butene | propylene | — | hexene |

TABLE 5-continued

|  |  | Comparative Example 8 | Comparative Example 9 | Comparative Example 10 | Comparative Example 11 | Comparative Example 12 |
|---|---|---|---|---|---|---|
| Propylene polymer | MFR (g/10 min) | 30 | 30 | 30 | 30 | 3 |
|  | Incorporation amount (wt %) | 90 | 70 | 70 | 100 | 70 |
|  | α-Olefin content (wt %) | 7 | 70 | 35 | — | 48 |
|  | Flexural rigidity (kg/cm$^2$) | 2,500 | 0 | 0 | — | 0 |
|  | Catalyst used | metallocene catalyst | metallocene catalyst | metallocene catalyst | — | metallocene catalyst |
|  | Incorporation amount (wt %) | 30 | 30 | 30 | — | 30 |
| Izod impact Strength (kg · cm/cm$^2$) | (23° C.) | 4.9 | not broken | 49.5 | 5.2 | unmoldable |
|  | (−40° C.) | 2.1 | 10.0 | 6.3 | 2.3 |  |
| Flexural modulus | (kg/cm$^2$) | 10,840 | 4,940 | 8,550 | 19,000 |  |

TABLE 6

|  |  | Unit | Example 1 | Example 21 | Example 22 | Example 23 | Example 24 | Example 25 |
|---|---|---|---|---|---|---|---|---|
| Component (A) | MFR | g/10 min | 30 | 42 | 15 | 73 | 24 | 17 |
|  | α-olefin content | wt % | 4 | 9.5 | 18 | 22 | 2.3 | 0 |
|  | Flexural rigidity | kg/cm$^2$ | 15,000 | 13,300 | 8,100 | 9,400 | 17,800 | 16,500 |
|  | Pulse NMR Component (I)/(II)/(III) | wt % | 66/26/8 | 63/19/18 | 52/21/27 | 49/31/20 | 74/20/6 | 67/28/5 |
|  | Component (I)/(II) | — | 2.5 | 3.3 | 2.5 | 1.6 | 3.7 | 2.4 |
|  | Component (III) | wt % | 8 | 18 | 27 | 20 | 6 | 5 |
| Component (B) | Density | g/cm$^3$ | 0.861 | 0.861 | 0.861 | 0.861 | 0.861 | 0.861 |
|  | MFR | g/10 min | 1.5 | 1.5 | 1.5 | 1.5 | 1.5 | 1.5 |
|  | α-olefin content | wt % | 48 | 48 | 48 | 48 | 48 | 48 |
|  | α-olefin | — | hexene-1 | hexene-1 | hexene-1 | hexene-1 | hexene-1 | hexene-1 |
|  | Olsen flexural modulus | kg/cm$^2$ | 0 | 0 | 0 | 0 | 0 | 0 |
| Composition | Component (A)/Component (B) ratio | wt % | 70/30 | 70/30 | 70/30 | 70/30 | 70/30 | 70/30 |
|  | Izod impact strength (23° C.) | kg · cm/cm$^2$ | NB* | NB | NB | NB | NB | NB |
|  | Izod impact strength (−40° C.) | kg · cm/cm$^2$ | 13.6 | 16 | NB | 18 | 8 | 7.3 |
|  | Flexural modulus | kg/cm$^2$ | 7,740 | 7,100 | 5,100 | 5,900 | 8,600 | 8,200 |
|  | Heat distortion temperature | °C. | 113 | 105 | 91 | 84 | 119 | 115 |
|  | Elongation at tensile rupture | % | >500 | >500 | >500 | >500 | 210 | 330 |
|  | Rockwell hardness | — | 35 | 31 | 24 | 28 | 40 | 41 |

NB: No break

TABLE 7

|  |  | Unit | Comp. Example 13 | Comp. Example 14 | Comp. Example 15 | Comp. Example 16 | Comp. Example 17 |
|---|---|---|---|---|---|---|---|
| Component (A) | MFR | g/10 min | 33 | 41 | 56 | 47 | 29 |
|  | α-olefin content | wt % | 27 | 19 | 5.4 | 0 | 20 |
|  | Flexural rigidity | kg/cm$^2$ | 5,600 | 9,600 | 19,400 | 18,000 | 4,700 |
|  | Pulse NMR Component (I)/(II)/(III) | wt % | 59/16/25 | 45/40/15 | 75/15/10 | 71/28/1 | 54/14/32 |
|  | Component (I)/(II) | — | 3.7 | 1.1 | 5 | 2.5 | 3.9 |
|  | Component (III) | wt % | 25 | 15 | 10 | 1 | 32 |
| Component (B) | Density | g/cm$^3$ | 0.861 | 0.861 | 0.861 | 0.861 | 0.861 |
|  | MFR | g/10 min | 1.5 | 1.5 | 1.5 | 1.5 | 1.5 |
|  | α-olefin content | wt % | 48 | 48 | 48 | 48 | 48 |
|  | α-olefin | — | hexene-1 | hexene-1 | hexene-1 | hexene-1 | hexene-1 |
|  | Olsen flexural modulus | kg/cm$^2$ | 0 | 0 | 0 | 0 | 0 |
| Composition | Component (A)/Component (B) ratio | wt % | 70/30 | 70/30 | 70/30 | 70/30 | 70/30 |
|  | Izod impact strength (23° C.) | kg · cm/cm$^2$ | NB | NB | NB | NB | NB |
|  | Izod impact strength (−40° C.) | kg · cm/cm$^2$ | NB | 14 | 8.2 | 3.5 | NB |
|  | Flexural modulus | kg/cm$^2$ | 3,600 | 6,300 | 8,900 | 9,500 | 2,800 |
|  | Heat distortion temperature | °C. | 81 | 69 | 121 | 120 | 85 |
|  | Elongation at tensile rupture | % | >500 | >500 | <50 | 250 | >500 |
|  | Rockwell hardness | — | 21 | 27 | 36 | 47 | 11 |

The propylene resin compositions of the present invention have improved impact resistance at both room temperature and low temperatures and a drastically improved property balance between rigidity and impact resistance and have excellent moldability as compared with conventional compositions into which rubbery elastic materials have been admixed. They are therefore useful in various fields such as exterior and interior automotive trims, for example, bumpers and interior panels and exterior trim parts of electrical apparatus.

What is claimed is:

1. A propylene resin composition which consists essentially of:
   55 to 93% by weight of a Component (A) which is a propylene polymer selected from the group consisting of a propylene homopolymer and a propylene-ethylene block copolymer having an ethylene content of 1 to 25% by weight,
   said propylene polymer having an MFR of 5 to 200 g/10 min, and a crystalline structure including a crystalline phase (I), an intermediate phase (II), and an amorphous phase (III), such that the weight ratio of crystalline phase (I)/intermediate phase (II) is 1.5 to 4 and the content of amorphous phase (III) is 3 to 30% by weight, said phases being determined by pulse NMR analysis, and 45 to 7% by weight of a Component (B) which is an ethylene-α-olefin copolymer having an α-olefin content of 10 to 60% by weight, said α-olefin being 1-butene or 1-hexene, said ethylene-α-olefin polymer being obtained by copolymerizing ethylene and said α-olefin by the use of a metallocene catalyst and having the following properties (a) to (c):

(a): a density of 0.913 g/cm$^3$ or less, (b): an MFR of 0.01 to 20 g/10 min, and (c): a flexural rigidity according to ASTM D747 of 2,000 kg/cm$^2$ or less.

2. A composition as claimed in claim 1, wherein the ethylene-α-olefin copolymer, the Component (B), is prepared by copolymerizing ethylene and an α-olefin in the presence of a catalyst comprising a combination of a metallocene compound and an alumoxane.

3. A composition as claimed in claim 1, wherein the weight ratio of Component (A):Component (B) is (90:10) to (60:40).

4. The composition as claimed in claim 1, wherein the propylene polymer is a propylene homopolymer.

5. The composition as claimed in claim 1, wherein the propylene polymer is a propylene-ethylene block copolymer.

6. The composition as claimed in claim 1, wherein the propylene polymer is a propylene-ethylene block copolymer having an ethylene content of 2 to 20% by weight.

7. The composition as claimed in claim 1, wherein the propylene polymer is a propylene-ethylene block copolymer having an ethylene content of 3 to 15% by weight.

8. The composition as claimed in claim 1, wherein the propylene polymer is a propylene-ethylene block copolymer prepared by homopolymerizing propylene and then continuing the polymerization for a mixture of propylene with ethylene.

9. The composition as claimed in claim 1, wherein the ratio of crystalline phase (I)/intermediate phase (II) is 2 to 3.5.

10. The composition as claimed in claim 1, wherein the content of the amorphous phase (III) is 5 to 20% by weight.

11. The composition as claimed in claim 1, wherein Component (B) has an α-olefin content of 20 to 50% by weight.

12. The composition as claimed in claim 1, wherein the density of the ethylene-α-olefin copolymer is 0.853–0.900 g/cm$^3$.

13. The composition as claimed in claim 1, wherein the density of the ethylene-α-olefin copolymer is 0.853–0.890 g/cm$^3$.

14. The composition as claimed in claim 1, wherein the density of the ethylene-α-olefin copolymer is 0.853–0.880 g/cm$^3$.

15. The composition as claimed in claim 1, wherein Component (B) has an MFR of 0.1 to 10 g/10 min.

16. The composition as claimed in claim 1, wherein Component (B) has an MFR of 0.3 to 5 g/10 min.

17. The composition as claimed in claim 1, wherein Component (B) has an MFR of 0.15 to 2 g/10 min.

18. The composition as claimed in claim 1, wherein Component (B) has a flexural rigidity according to ASTM D747 of 1,000 kg/cm$^2$.

19. The composition as claimed in claim 1, wherein Component (B) has a flexural rigidity according to ASTM D747 of 300 kg/cm$^2$.

20. The composition as claimed in claim 1, wherein Components (A) and (B) are incorporated into the propylene resin composition in a weight ratio (A)/(B) of 80:20 to 65:35.

* * * * *